(12) United States Patent
Lipsky et al.

(10) Patent No.: US 11,373,475 B1
(45) Date of Patent: Jun. 28, 2022

(54) SYSTEM AND METHOD OF RECORDING VOTER SELECTIONS

(71) Applicants: Dave Lipsky, Copiague, NY (US); Seth Shapiro, Copiague, NY (US)

(72) Inventors: Dave Lipsky, Copiague, NY (US); Seth Shapiro, Copiague, NY (US)

(*) Notice: Subject to any disclaimer, the term of this patent is extended or adjusted under 35 U.S.C. 154(b) by 0 days.

(21) Appl. No.: 17/677,029

(22) Filed: Feb. 22, 2022

(51) Int. Cl.
| | |
|---|---|
| *G07C 13/00* | (2006.01) |
| *G06V 10/82* | (2022.01) |
| *G06V 40/16* | (2022.01) |
| *G06V 30/10* | (2022.01) |
| *G06V 30/416* | (2022.01) |

(52) U.S. Cl.
CPC ............ *G07C 13/00* (2013.01); *G06V 10/82* (2022.01); *G06V 30/10* (2022.01); *G06V 30/416* (2022.01); *G06V 40/172* (2022.01)

(58) Field of Classification Search
CPC ........ G07C 13/00; G06V 10/82; G06V 30/10; G06V 30/416; G06V 40/172
See application file for complete search history.

(56) References Cited

U.S. PATENT DOCUMENTS

| 9,946,930 B2 * | 4/2018 | Matos ..................... G06V 40/40 |
| 2021/0135862 A1 * | 5/2021 | Morales ................ H04L 9/3239 |

OTHER PUBLICATIONS

El-Sayad et al. ("Face Recognition as an Authentication Technique in Electronic Voting" International Journal of Advanced Computer Science and Applications (IJACSA), 4(6), 2013. Http://dx.doi.org/10.14569/IJACSA.2013.040610) (Year: 2013).*

* cited by examiner

*Primary Examiner* — Seung H Lee
(74) *Attorney, Agent, or Firm* — Sean R. Wilsusen, Esq.; Carter, DeLuca & Farrell LLP (57) ABSTRACT

A computer-implemented method of recording voter selections includes receiving a first digital image of an official identification card and a second digital image including a putative digital image of the individual and a putative digital image of the official identification card. A first set of unique identification data of the individual is captured from the first image. A second set of unique identification data of the individual is captured from the putative digital image of the official identification card. A match score is determined based on the first set of unique identification data and the second set of unique identification data. The individual is registered with a voter selection system based on the match score exceeding a predetermined match score threshold. Voting selections from the individual are received and stored at the voter selection system.

20 Claims, 9 Drawing Sheets

SYSTEM AND METHOD OF RECORDING VOTER SELECTIONS

FIELD

The present disclosure relates to voter selections and, more particularly, to a system and method of recording voter selections.

BACKGROUND

Voting is a method for a group (e.g., a meeting or an electorate) employed to make a collective decision or express an opinion, generally following discussions, debates or election campaigns. Democracies elect holders of offices by voting. Residents of a place represented by an elected official may be referred to as "constituents," and the constituents who cast a ballot for a chosen candidate may be referred to as "voters." Various systems can be employed for collecting votes.

As an example, in relatively small organizations, voting can be performed in different ways. A ballot, such as a paper or electronic ballot, can be used to elect others for an elected position (e.g., within a workplace). Ballots can be used to elect members of political associations or to choose roles within an organization.

Vote counting is the process of counting votes that have been cast in an election. Vote counting can be performed manually or by machines. However, either process of vote counting can result in errors and thus there is a need for a system and method of accurately counting votes and recording such votes for review and verification.

SUMMARY

Provided in accordance with aspects of the present disclosure is a computer-implemented method of recording voter selections. The method includes receiving a first digital image of an official identification card. The official identification card includes a photograph of an individual. The method includes receiving a second digital image. The second digital image includes a putative digital image of the individual and a putative digital image of the official identification card. The method includes capturing a first set of unique identification data of the individual from the first image of the official identification card using at least one of optical character recognition (OCR) or a convolutional neural network (CNN). The method includes capturing a second set of unique identification data of the individual from the putative digital image of the official identification card using the at least one of OCR or CNN. The method includes determining, by the CNN, a match score based on the first set of unique identification data of the individual and the second set of unique identification data of the individual. The match score indicates a quality of match between the first set of unique identification data of the individual and the second set of unique identification data of the individual. The method includes registering the individual with a voter selection system based on the match score exceeding a predetermined match score threshold. The method includes receiving, at the voter selection system, voting selections from the individual. The voting selections received from the individual are stored in the voter selection system.

In an aspect of the present disclosure, verified unique identification data of the individual is stored in the voter selection system. The verified unique identification data of the individual is compared with verified unique identification data of other individuals stored in the voter selection system to identify an occurrence of duplicate registrations for a same individual in the voter selection system.

In an aspect of the present disclosure, duplicate registrations for the same individual are removed from the voter selection system.

In an aspect of the present disclosure, a third digital image including a second putative digital image of the individual and a second putative digital image of the official identification card are requested at a predetermined time point after the second digital image is received. The third digital image including the second putative digital image of the individual and the second putative digital image of the official identification card are received. A third set of unique identification data of the individual is captured from the second putative digital image of the official identification card using the at least one of OCR or CNN. A second match score is determined based on the first set of unique identification data of the individual and the third set of unique identification data of the individual. The second match score indicates a quality of match between the first set of unique identification data of the individual and the third set of unique identification data of the individual. The registration of the individual is maintained with the voter selection system if the second match score exceeds a second predetermined match score threshold.

In an aspect of the present disclosure, if the second match score is below the second predetermined match threshold, a signal is sent to perform a manual comparison between the third digital image and the first digital image.

In an aspect of the present disclosure, a first facial recognition analysis on the photograph of the individual is performed to generate a first facial recognition map. A second facial recognition analysis is performed on the putative digital image of the individual to generate a second facial recognition map. The first facial recognition map is compared with the second facial recognition map. A second match score is determined between the first facial recognition map and the second facial recognition map. The second match score is compared with a second predetermined match score threshold. The registration of the individual with the voter selection system is allowed if the second match score exceeds the second predetermined match score threshold.

In an aspect of the present disclosure, a digital image including an image of a ballot indicating at least some voting selections from the individual is received. The digital image is stored in the voter selection system.

In an aspect of the present disclosure, an internet protocol (IP) address from which the first digital image or the second digital image is received is determined. The physical location associated with the IP address is determined. A signal indicating a suspicious IP address is sent if the determined physical location associated with the IP address is outside of a predetermined geographic area.

BRIEF DESCRIPTION OF THE DRAWINGS

Various aspects and features of the present disclosure are described hereinbelow with reference to the drawings wherein.

DETAILED DESCRIPTION

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Generally, elections are conducted over a predefined time period on a single day, and the vote tallies are often completed and reported on the night of the election or shortly thereafter. This fast-paced process involving potentially millions of ballots cast by millions of different voters may require at least some level of automation to guarantee that accuracy of the vote count. Thus, the voter selection system described herein provides a system and method for securely registering and verifying voters in advance of an election, and verifying the identity of the individual casting and recording votes on the day of an election. Votes recorded in the voter selection system can be nearly immediately counted at an extremely high level of accuracy, and thus vote tallies can be observed in real-time. The stored votes are also available for subsequent review and verification.

The voter selection system described herein may be a cloud-based application that is accessible through a device such as a smartphone, tablet computer, or laptop computer, or through a specialized hardware device such as a voting kiosk.

Figure 1:
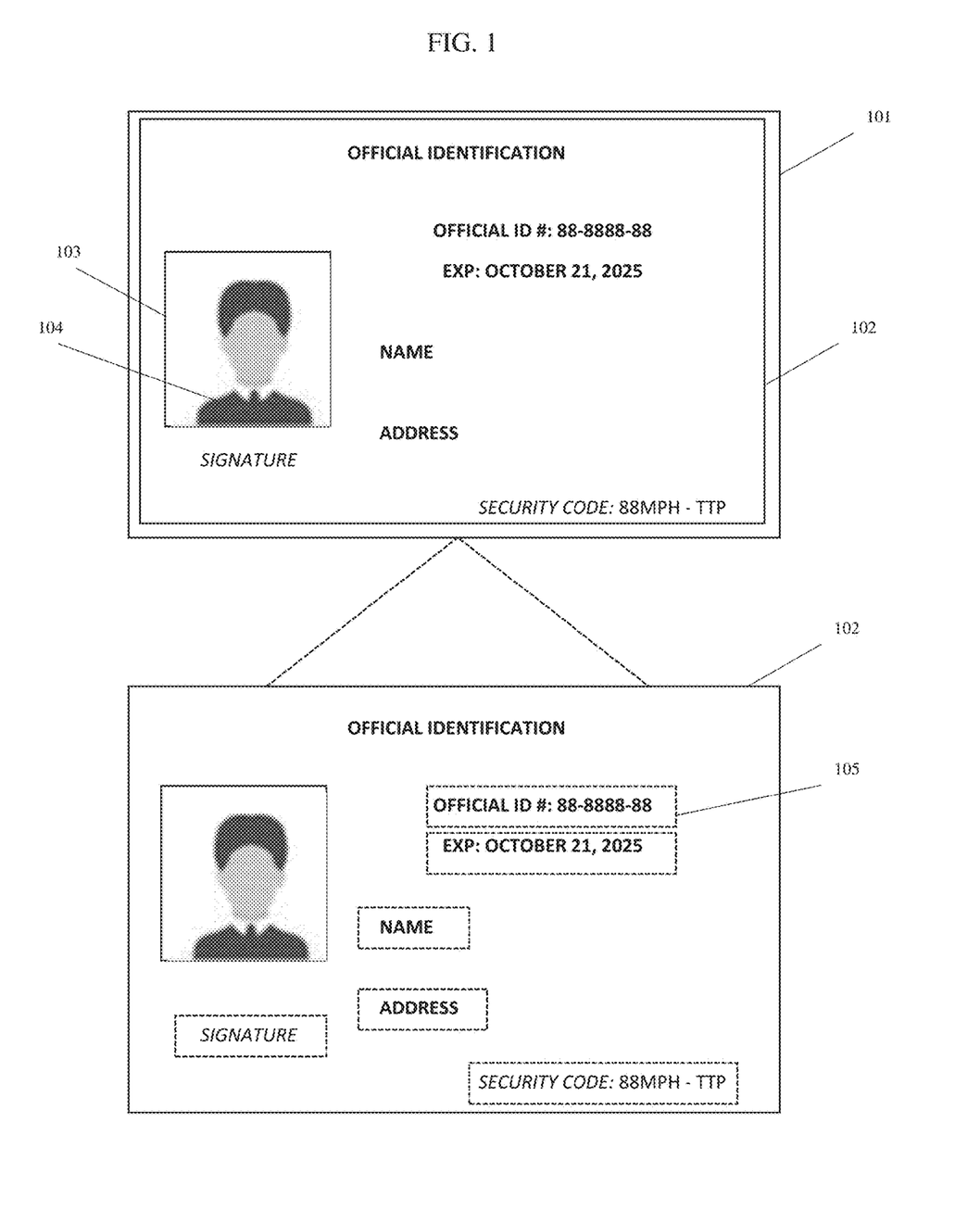
FIG. 1 illustrates an exemplary official identification card including unique identification data of an individual and data capture of the unique identification data according to aspects of the present disclosure.

Referring particularly to FIG. 1, a computer-implemented method of recording voter selections includes receiving a first digital image 101 of an official identification (ID) card 102. The official identification card 102 includes a photograph 103 of an individual 104.

The unique identification card 102 may be a physical card, a voter ID card, a state-issued ID, a driver's license, a state, federal, or internationally issued non-driver ID card, a passport or international identification card, or a state or federally approved digital identification card, such as a digital identification card displayed on a smartphone. The digital identification card 102 may include a unique bar code or quick response (QR) code. The unique identification card 102 includes various unique identifying numbers, symbols or characters, such as official ID number, expiration date, name, address, signature, and a security code.

Figure 3:
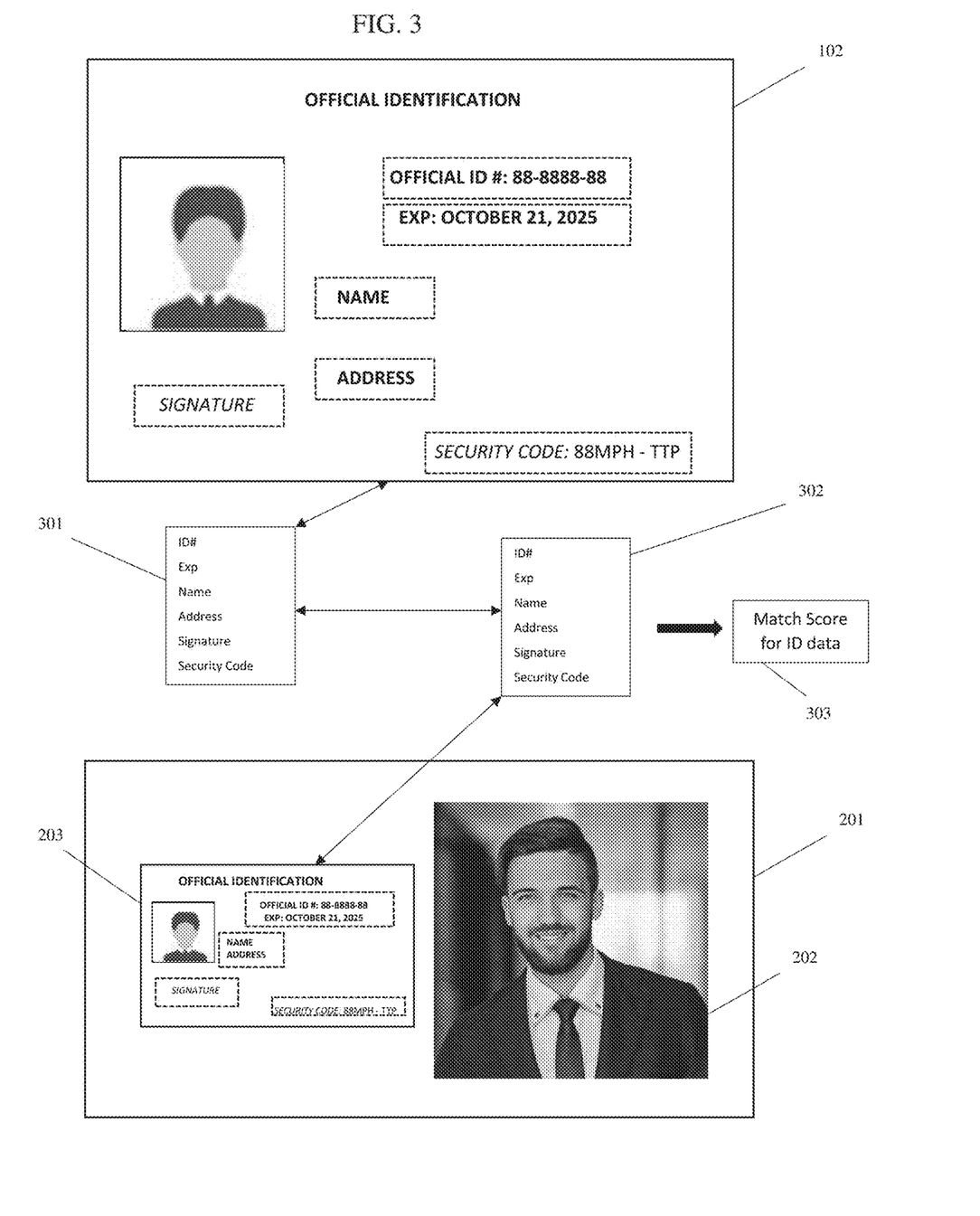
FIG. 3 illustrates a process of generating a match score by comparing a captured set of unique identification data from an official identification card and a captured set of unique set of unique identification data from a digital image including a putative image of the official identification card.

Referring to FIGS. 1 and 3, a first set of unique identification data 301 of the individual 104 is captured from the first image 101 of the official identification card 102. The first set of unique identification data 301 may include, for example, ID #, expiration date, name, address, signature and security code. The first set of unique identification data 301 of the individual 104 can be captured using at least one of optical character recognition (OCR) or a machine learning model, such as a convolutional neural network (CNN). Dashed lines 105 illustrated in FIGS. 1 and 3 illustrate captured unique identification data from the official identification card 102. The machine learning model may be trained on tagged data, such as images of official identification cards of different states. The trained CNN, trained machine learning model, or other form of decision or classification process may be used to implement one or more of the methods, functions, processes, or operations described herein. Note that a neural network or deep learning model may be characterized in the form of a data structure in which are stored data representing a set of layers containing nodes, and connections between nodes in different layers are created (or formed) that operate on an input to provide a decision or value as an output.

Machine learning may be used to enable the analysis of data and assist in making decisions. In order to benefit from using machine learning, a machine learning algorithm is applied to a set of training data and labels to generate a "model" which represents what the application of the algorithm has "learned" from the training data. Each element (or example, in the form of one or more parameters, variables, characteristics or "features") of the set of training data is associated with a label or annotation that defines how the element should be classified by the trained model. A machine learning model predicts a defined outcome based on a set of features of an observation. The machine learning model is built by training on a dataset which includes features and known outcomes. There are various types of machine learning algorithms, including linear models, support vector machines (SVM), random forest, and/or XGBoost. A machine learning model may include a set of layers of connected neurons that operate to decide (such as a classification) regarding a sample of input data. When trained (e.g., the weights connecting neurons have converged and become stable or within an acceptable amount of variation), the model will operate on a new element of input data to generate the correct label or classification as an output. Any other suitable machine learning model may be used.

Figure 2:
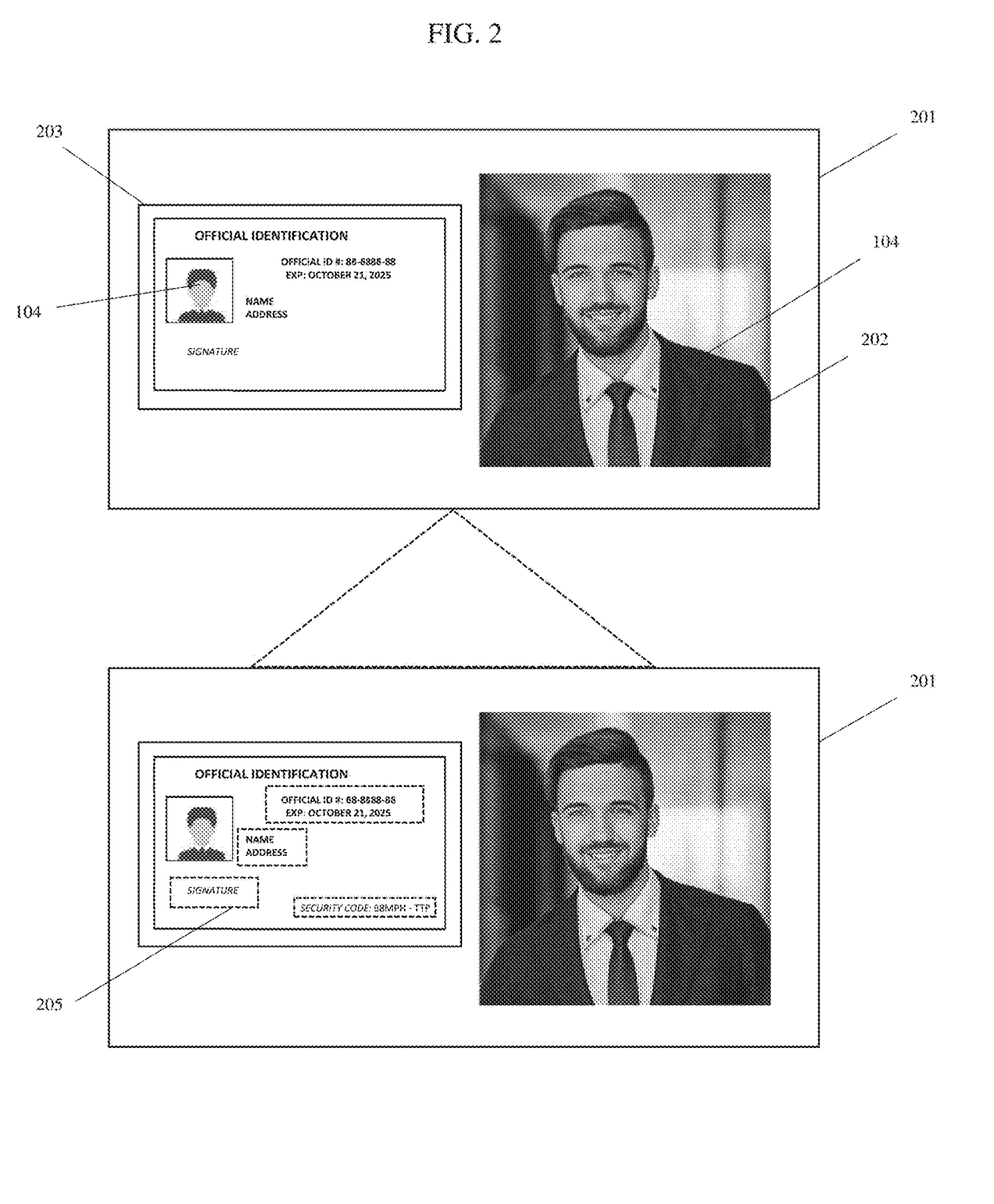
FIG. 2 illustrates an exemplary digital image including a putative digital image of the individual and a putative digital image of the official identification card and data capture of the unique identification data from the digital image according to aspects of the present disclosure.

Referring particularly to FIG. 2, a second digital image 201 is received. The second digital image 201 may be a self-captured digital image (e.g., a "selfie") including images of the individual 104 and the unique identification card 102. The second digital image 201 includes a putative digital image 202 of the individual 104 and a putative digital image 203 of the official identification card 203.

Referring particularly to FIGS. 2 and 3, a second set of unique identification data 302 of the individual 104 is captured from the putative digital image of the official identification card using the at least one of OCR or CNN. The second set of unique identification data 302 may include, for example, ID #, expiration date, name, address, signature and security code. Dashed lines 205 illustrated in FIGS. 2 and 3 illustrate captured unique identification data from the putative digital image 203 of the official identification card 203.

Referring particularly to FIG. 3, a match score 303 is determined based on the first set of unique identification data 301 of the individual 104 and the second set of unique identification data 302 of the individual 104. The match score 303 may be determined by the CNN. The match score 303 indicates a quality of match between the first set of unique identification data 301 of the individual 104 and the second set of unique identification data 302 of the individual 104. The match score 303 may be, for example, a score from 0-100, in which 0 indicates no matching data between the first set of unique identification data 301 of the individual 104 and the second set of unique identification data 302 of the individual 104 and 100 indicates a complete match between the first set of unique identification data 301 of the individual 104 and the second set of unique identification data 302 of the individual 104.

The individual 104 is registered with a voter selection system based on the match score 303 exceeding a predetermined match score threshold. As an example, the predetermined match score threshold applied to a comparison between the first set of unique identification data 301 of the individual 104 and the second set of unique identification data 302 of the individual 104 may be 100. That is, registration with the voter selection system is permitted only after a registrant has successfully submitted (e.g., by uploading to the system) a verified image of an official form of identification and a secondary upload of a digital image including a photograph of the individual holding or adjacent the same official form of registration.

After an individual/user is registered with the voter selection system through the verification processes described herein, the user is able to log into the system to enter his or her voter selections from any of a variety of elections. The voting selections received from the individual are stored in the voter selection system for later access. The stored selections can be employed for verification or counting purposes.

Figure 4:
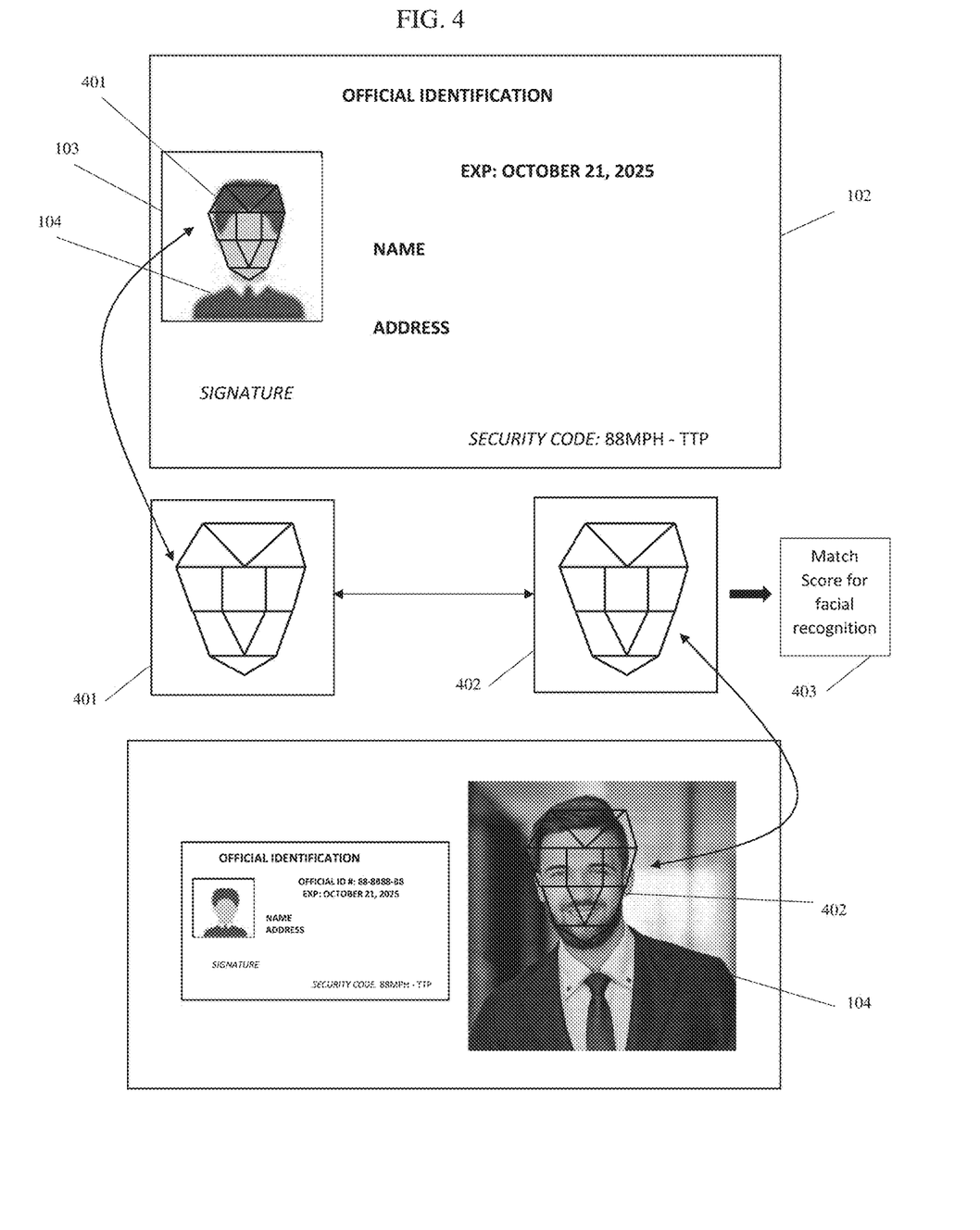
FIG. 4 illustrates a process of generating a match score by comparing a first facial recognition map from the unique identification card and a second facial recognition map from a putative digital image of an individual.

In an aspect of the present disclosure, if one or both of match scores 303 and/or 403 is below the corresponding predetermined match threshold, a signal is sent to perform a manual comparison between the submitted images.

Referring particularly to FIG. 4, a first facial recognition analysis on the photograph 103 of the individual 104 is performed to generate a first facial recognition map 401. A second facial recognition analysis is performed on the putative digital image 202 of the individual 104 to generate a facial recognition map 402. The first facial recognition map 401 is compared with the second facial recognition map 402. The generation of the facial recognition maps 401, 402 and the comparison of the facial recognition maps 401, 402 may be performed by the CNN. A match score 403 is determined (e.g., by the CNN) between the first facial recognition map 401 and the second facial recognition map 402. The match score 403 is compared with a predetermined match score threshold to determine if the individual displayed in photographs 103 and 104 is the same individual. The match score 403 indicates a quality of match between the facial recognition maps 401, 402. The match score 403 may be, for example, a score from 0-100. The registration of the individual 104 with the voter selection system is allowed if the second match 403 score exceeds the predetermined match score threshold with respect to the facial recognition analysis.

Figure 5:
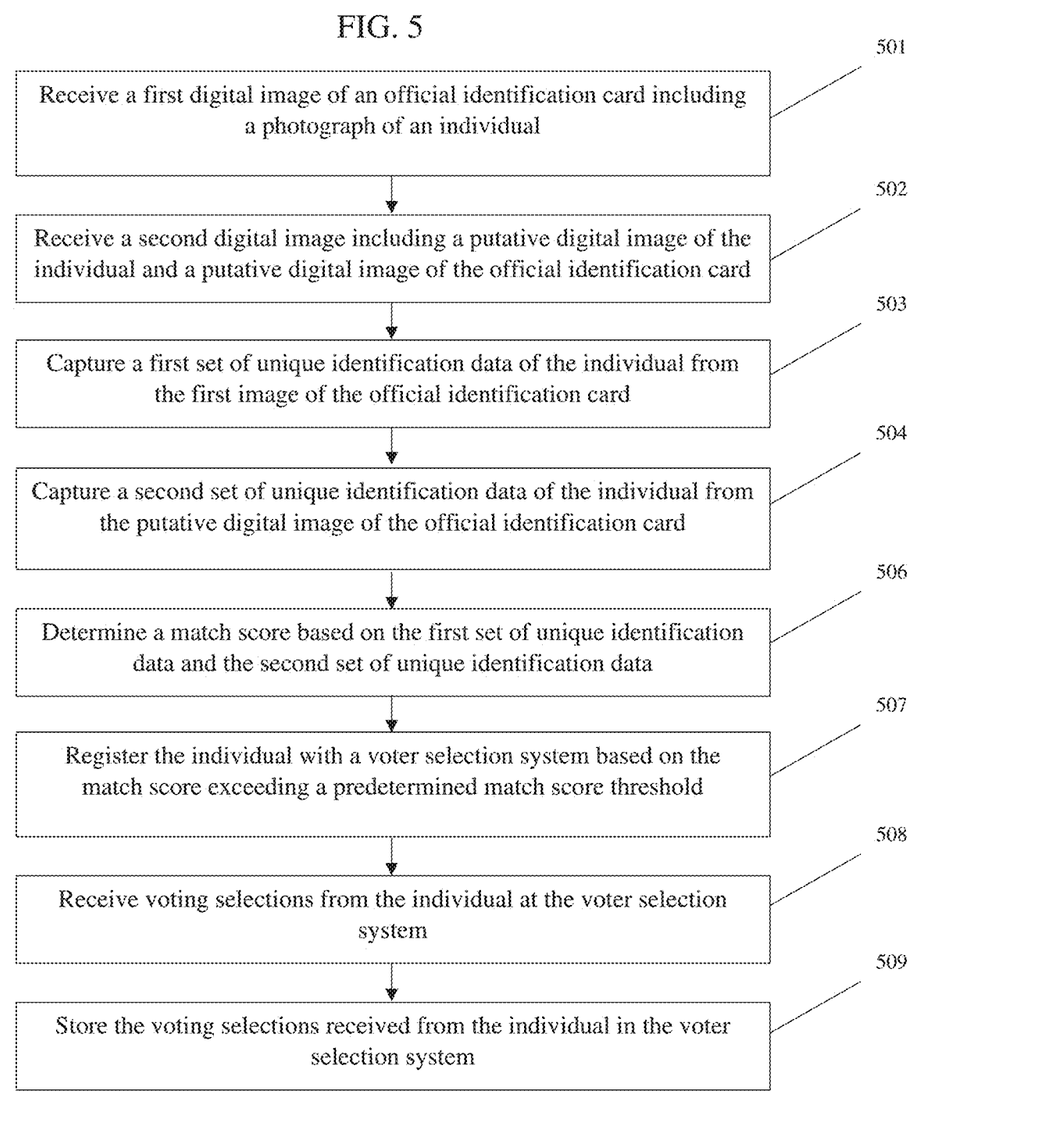
FIG. 5 is a flowchart of a method of recording voter selections according to aspects of the present disclosure.

Referring to FIG. 5, an exemplary computer-implemented algorithm for securely registering an individual with the voter selection system and recording voter selections from the individual/user includes receiving a first digital image of an official identification card (step 501). The computer-implemented algorithm includes receiving a second digital image including a putative digital image of the individual and a putative digital image of the official identification card (step 502). The computer-implemented algorithm includes capturing a first set of unique identification data of the individual from the first image of the official identification card (step 503). The computer-implemented algorithm includes capturing a second set of unique identification data of the individual from the putative digital image of the official identification card (step 504). The computer-implemented algorithm includes determining a match score based on the first set of unique identification data of the individual and the second set of unique identification data of the individual (step 505). The computer-implemented algorithm includes registering the individual with a voter selection system based on the match score exceeding a predetermined match score threshold (step 506). The computer-implemented algorithm includes receiving voting selections from the individual (step 507). The voting selections received from the individual are stored in the voter selection system (step 508).

Figure 6:
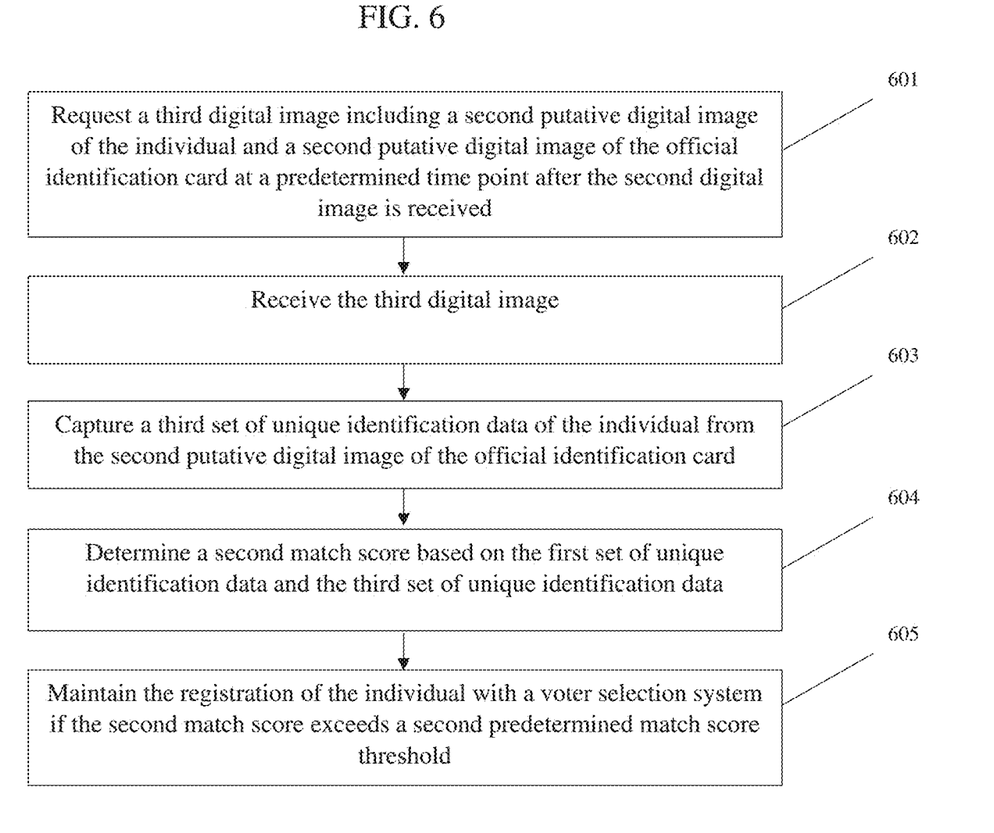
FIG. 6 is a flowchart of a method of confirming a registration of an individual with a voter selection system according to aspects of the present disclosure.

Referring to FIG. 6, an exemplary computer-implemented algorithm for re-verifying a an individual/user of the voter selection system includes requesting a third digital image including a second putative digital image of the individual and a second putative digital image of the official identification card are requested at a predetermined time point after the second digital image is received (step 601). The third digital image including the second putative digital image of the individual and the second putative digital image of the official identification card are received by the voter selection system (step 602). A third set of unique identification data of the individual is captured from the second putative digital image of the official identification card (step 603). A second match score is determined based on the first set of unique identification data of the individual and the third set of unique identification data of the individual (step 604). The registration of the individual is maintained with the voter selection system if the second match score exceeds a second predetermined match score threshold (step 605).

Re-verification of a previously registered user may be performed periodically to confirm the identity of the individual and to confirm that the individual has a valid official identification. As an example, re-verification may be performed once per year.

Figure 7:
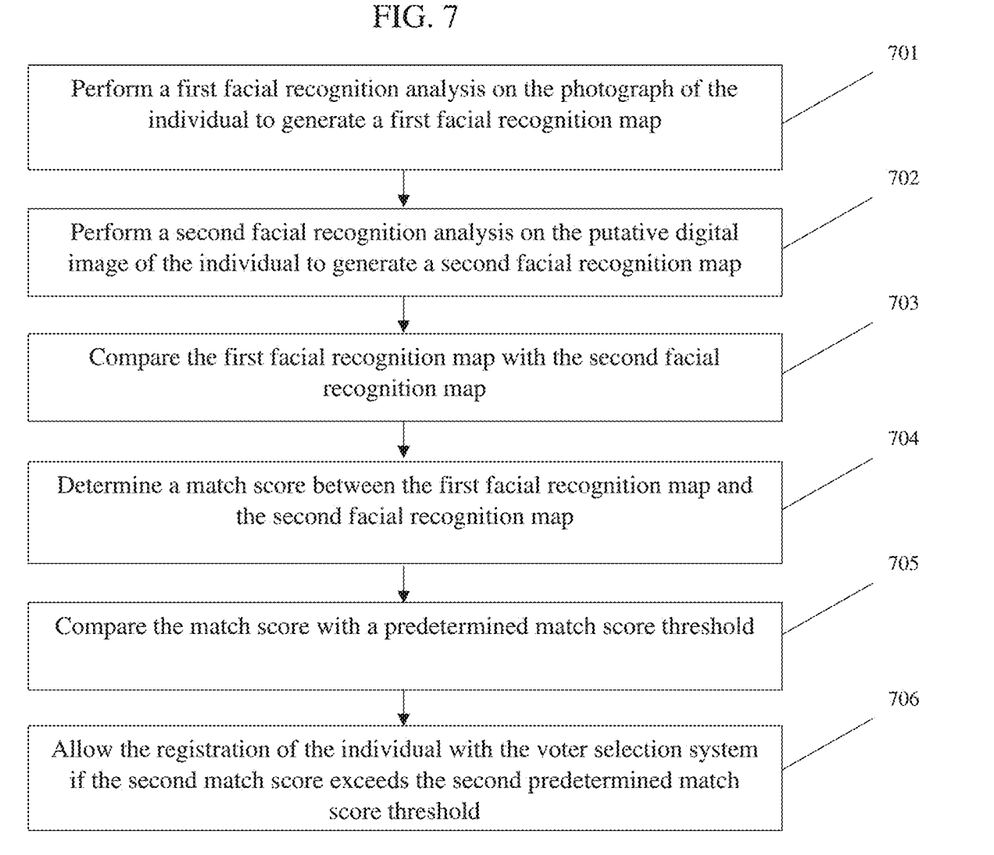
FIG. 7 is a flowchart of a method of comparing first and second facial recognition maps according to aspects of the present disclosure.

Referring to FIG. 7, an exemplary computer-implemented algorithm for verifying an identify of an individual through facial recognition includes performing a first facial recognition analysis on the photograph of the individual to generate a first facial recognition map (step 701). A second facial recognition analysis is performed on the putative digital image of the individual to generate a second facial recognition map (step 702). The first facial recognition map is compared with the second facial recognition map (step 703). A second match score is determined between the first facial recognition map and the second facial recognition map (step 704). The second match score is compared with a second predetermined match score threshold (step 705). The registration of the individual with the voter selection system is allowed if the second match score exceeds the second predetermined match score threshold (step 706).

In an aspect of the present disclosure, verified unique identification data of the individual 104 is stored in the voter selection system. The verified unique identification data of the individual 104 is compared with verified unique identification data of other individuals stored in the voter selection system to identify an occurrence of duplicate registrations for a same individual in the voter selection system. Duplicate registrations for the same individual are removed from the voter selection system.

In an aspect of the present disclosure, an internet protocol (IP) address from which the digital image 101 or the digital image 201 is received is determined. The physical location associated with the IP address is determined. A signal indicating a suspicious IP address is sent if the determined physical location associated with the IP address is outside of a predetermined geographic area.

In an aspect of the present disclosure, a digital image including an image of a ballot indicating at least some voting selections from the individual is received by the voter selection system. The digital image is stored in the voter selection system.

As an example, a specialized kiosk including a digital camera and a computer having a network interface is employed for capturing an image of the ballot cast by the individual. The kiosk may be utilized at a voting site. The computer may have a network interface configured to connect with the voter selection system.

In aspects of the present disclosure, the voter selection system includes an application (e.g., a smartphone or tablet computer application) employed for interfacing with the voter selection system. As an example, the smartphone application displays a unique bar code that is scanned by the camera of the specialized kiosk to initiate a connection between the smartphone or the specialized kiosk and the voter selection system. Thus, the smartphone application can be used to authenticate a user that is seeking to record their voting selections with the voter selection system. While the application may generate and display its own unique bar card, a unique bar code included in a digital identification card may also be employed for generating a link between the specialized kiosk and the voter selection system.

When a previously registered individual seems to log into the voter selection system to submit their voter selections, a multi-factor authentication protocol (e.g., two-step authentication) may be utilized to allow access to the voter selection system.

Figure 8:
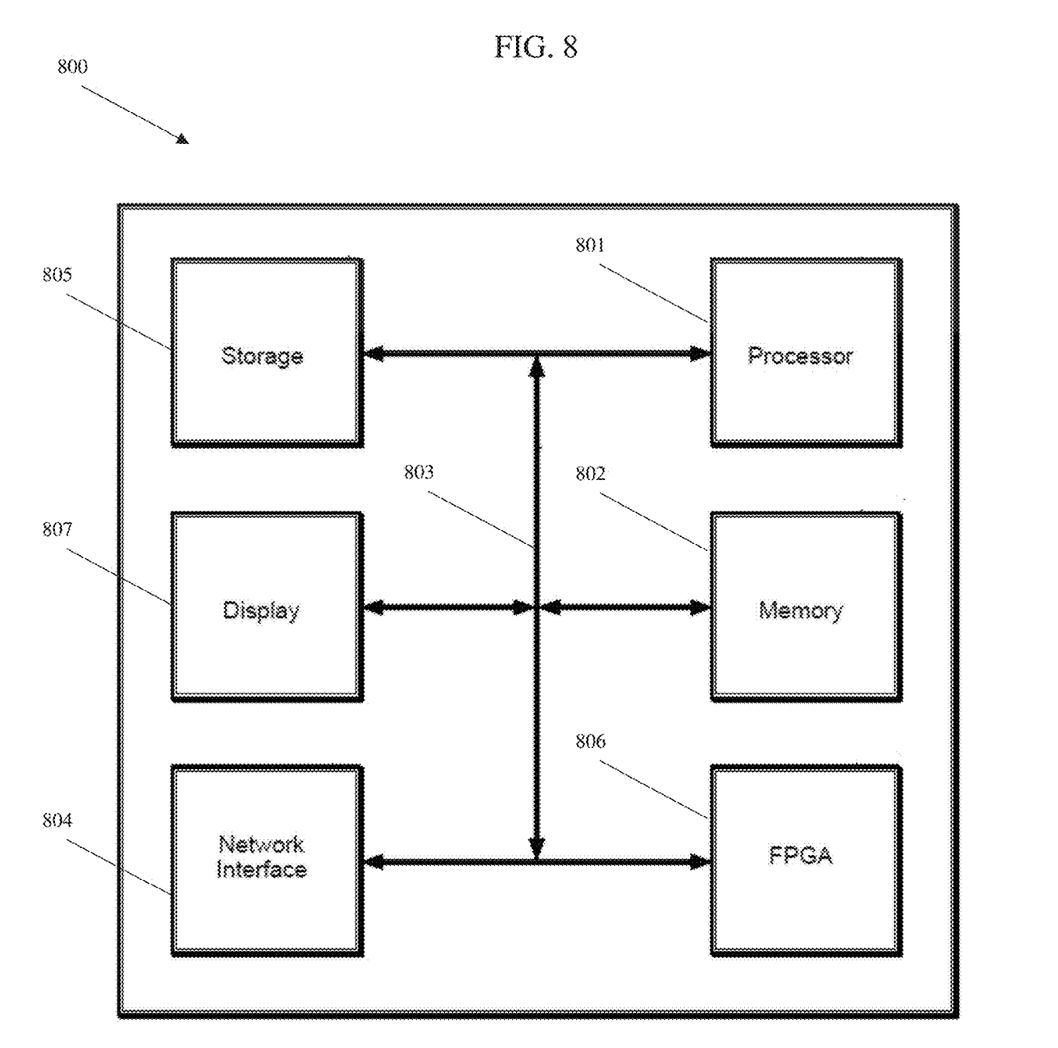
FIG. 8 is a block diagram of an exemplary computer for implementing the method of recording voter selections according to aspects of the present disclosure.

Referring to FIG. 8, a general purpose computer 800 is described. The general purpose computer 800 can be employed by the voter selection system described herein to perform the various methods and algorithms described herein. The computer 800 may include a processor 801 connected to a computer-readable storage medium or a memory 802 which may be a volatile type memory, e.g., RAM, or a non-volatile type memory, e.g., flash media, disk media, etc. The processor 801 may be another type of processor such as, without limitation, a digital signal processor, a microprocessor, an ASIC, a graphics processing unit (GPU), field-programmable gate array (FPGA), or a central processing unit (CPU).

In some aspects of the disclosure, the memory 802 can be random access memory, read-only memory, magnetic disk memory, solid state memory, optical disc memory, and/or another type of memory. The memory 802 can communicate with the processor 801 through communication buses 803 of a circuit board and/or through communication cables such as serial ATA cables or other types of cables. The memory 802 includes computer-readable instructions that are executable by the processor 801 to operate the computer 800 to execute the algorithms described herein. The computer 800 may include a network interface 804 to communicate (e.g., through a wired or wireless connection) with other computers or a server. A storage device 805 may be used for storing data. The computer 800 may include one or more FPGAs 806. The FPGA 806 may be used for executing various machine learning algorithms. A display 807 may be employed to display data processed by the computer 800.

Figure 9:
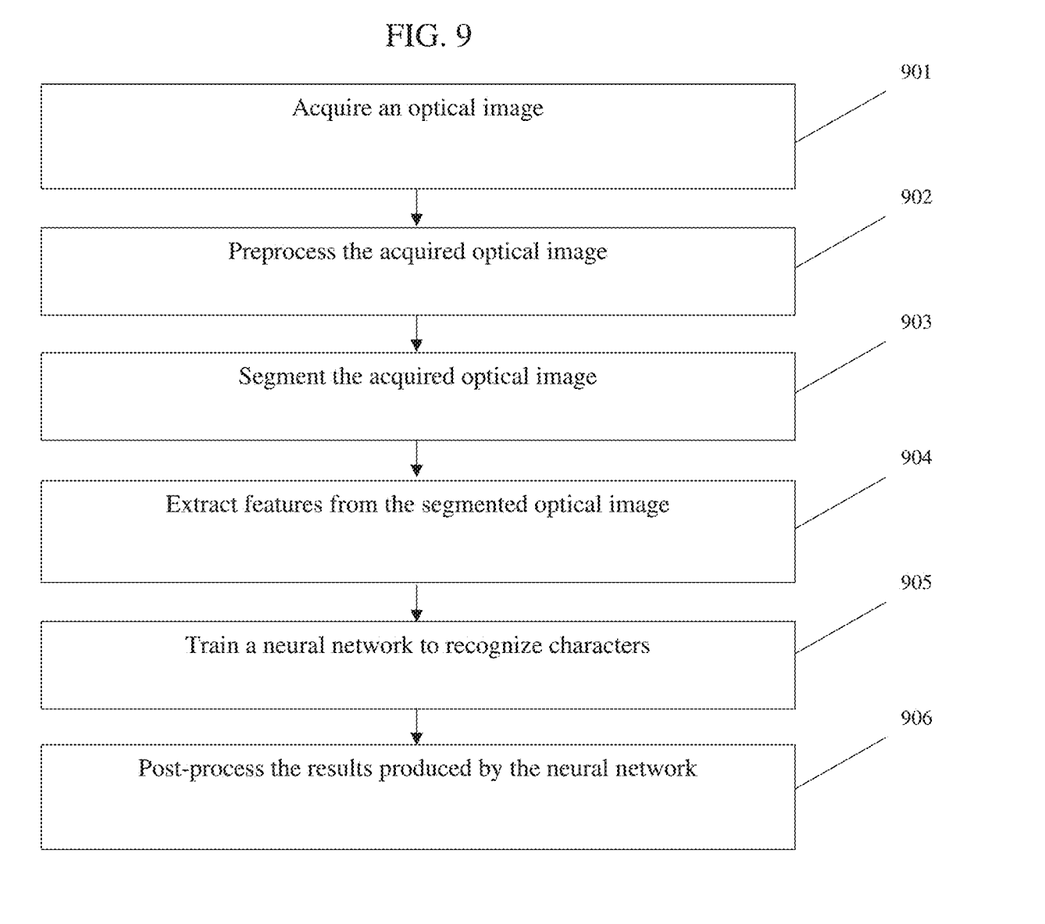
FIG. 9 illustrates an exemplary algorithm that may be employed for OCR according to aspects of the present disclosure.

FIG. 9 illustrates an exemplary algorithm that may be employed for OCR according to aspects of the present disclosure. Referring to FIG. 9, the algorithm includes acquiring an optical image (step 901), such as be capturing a digital image. The acquired optical image undergoes preprocessing (step 902). The acquired optical image is segmented (step 903) to group characters into meaningful chunks (e.g., patterns indicative of a security code or an identification number from an official identification card). Features of the segmented optical image are extracted (step 904) by splitting each character into a particular class. A neural network is trained to recognize characters (step 905). The results produced by the neural network undergo post-processing (step 906) to correct for any errors made by the neural network.

The neural network can be trained using a dataset including known matching and non-matching entries (e.g., data of previously verified individuals in the voter selection system and data of entries that could not be verified).

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A computer-implemented method of recording voter selections, the method comprising:
   receiving a first digital image of an official identification card, the official identification card including a photograph of an individual;
   receiving a second digital image, the second digital image including a putative digital image of the individual and a putative digital image of the official identification card;
   capturing a first set of unique identification data of the individual from the first image of the official identification card using at least one of optical character recognition (OCR) or a convolutional neural network (CNN);
   capturing a second set of unique identification data of the individual from the putative digital image of the official identification card using the at least one of OCR or CNN;
   determining, by the CNN, a match score based on the first set of unique identification data of the individual and the second set of unique identification data of the individual, wherein the match score indicates a quality of match between the first set of unique identification data of the individual and the second set of unique identification data of the individual;

registering the individual with a voter selection system based on the match score exceeding a predetermined match score threshold;
receiving, at the voter selection system, voting selections from the individual; and
storing the voting selections received from the individual in the voter selection system.

2. The method of claim 1, further including storing verified unique identification data of the individual in the voter selection system and comparing the verified unique identification data of the individual with verified unique identification data of other individuals stored in the voter selection system to identify an occurrence of duplicate registrations for a same individual in the voter selection system.

3. The method of claim 2, further including removing at least one of the duplicate registrations for the same individual from the voter selection system.

4. The method of claim 1, further including:
requesting a third digital image including a second putative digital image of the individual and a second putative digital image of the official identification card at a predetermined time point after the second digital image is received;
receiving the third digital image including the second putative digital image of the individual and the second putative digital image of the official identification card;
capturing a third set of unique identification data of the individual from the second putative digital image of the official identification card using the at least one of OCR or CNN
determining, by the CNN, a second match score based on the first set of unique identification data of the individual and the third set of unique identification data of the individual, wherein the second match score indicates a quality of match between the first set of unique identification data of the individual and the third set of unique identification data of the individual; and
maintaining the registration of the individual with the voter selection system if the second match score exceeds a second predetermined match score threshold.

5. The method of claim 4, further including:
determining the second match score is below the second predetermined match threshold; and
sending a signal to perform a manual comparison between the third digital image and the first digital image.

6. The method of claim 1, further including:
determining the match score is below the predetermined match score threshold; and
sending a signal to perform a manual comparison between the first digital image and the second digital image.

7. The method of claim 1, further including:
performing, by the CNN, a first facial recognition analysis on the photograph of the individual to generate a first facial recognition map;
performing, by the CNN, a second facial recognition analysis on the putative digital image of the individual to generate a second facial recognition map;
comparing, by the CNN, the first facial recognition map with the second facial recognition map;
determining, by the CNN, a second match score between the first facial recognition map and the second facial recognition map;
comparing, by the CNN, the second match score with a second predetermined match score threshold; and
allowing the registration of the individual with the voter selection system if the second match score exceeds the second predetermined match score threshold.

8. The method of claim 7, further including:
determining the second match score is below the second predetermined match threshold; and
sending a signal to perform a manual comparison between the first digital image and the second digital image.

9. The method of claim 1, further including:
receiving a third digital image including an image of a ballot indicating at least some voting selections from the individual; and
storing the third digital image in the voter selection system.

10. The method of claim 1, further including:
determining an internet protocol (IP) address from which the first digital image or the second digital image is received;
determining the physical location associated with the IP address; and
sending a signal indicating a suspicious IP address if the determined physical location associated with the IP address is outside of a predetermined geographic area.

11. A method of recording voter selections, the method comprising:
receiving a first digital image of an official identification card, the official identification card including a photograph of an individual;
receiving a second digital image, the second digital image including a putative digital image of the individual and a putative digital image of the official identification card;
capturing a first set of unique identification data of the individual from the first image of the official identification card;
capturing a second set of unique identification data of the individual from the putative digital image of the official identification card;
comparing the first set of unique identification data of the individual with the second set of unique identification data of the individual;
determining a match score based on the first set of unique identification data of the individual and the second set of unique identification data of the individual, wherein the match score indicates a quality of match between the first set of unique identification data of the individual and the second set of unique identification data of the individual;
registering the individual with a voter selection system if the match score exceeds a predetermined threshold;
receiving, at the voter selection system, voting selections from the individual; and
storing the voting selections received from the individual in the voter selection system.

12. The method of claim 11, further including storing verified unique identification data of the individual in the voter selection system and comparing the verified unique identification data of the individual with verified unique identification data of other individuals stored in the voter selection system to identify an occurrence of duplicate registrations for a same individual in the voter selection system.

13. The method of claim 12, further including removing at least one of the duplicate registrations for the same individual from the voter selection system.

14. The method of claim 11, further including:

requesting a third digital image including a second putative digital image of the individual and a second putative digital image of the official identification card at a predetermined time point after the second digital image is received;

receiving the third digital image including the second putative digital image of the individual and the second putative digital image of the official identification card;

capturing a third set of unique identification data of the individual from the second putative digital image of the official identification card;

comparing the first set of unique identification data of the individual with the third set of unique identification data of the individual;

determining a second match score between the first set of unique identification data of the individual and the third set of unique identification data of the individual;

comparing the second match score with a second predetermined match score threshold; and maintaining the registration of the individual with the voter selection system if the second match score exceeds the second predetermined match score threshold.

15. The method of claim 14, further including:

determining the second match score is below the second predetermined match threshold; and sending a signal to perform a manual comparison between the third digital image and the first digital image.

16. The method of claim 11, further including:

determining the match score is below the predetermined match score threshold; and sending a signal to perform a manual comparison between the first digital image and the second digital image.

17. The method of claim 11, further including:

performing a first facial recognition analysis on the photograph of the individual to generate a first facial recognition map;

performing a second facial recognition analysis on the putative digital image of the individual to generate a second facial recognition map;

comparing the first facial recognition map with the second facial recognition map;

determining a second match score between the first facial recognition map and the second facial recognition map;

comparing the second match score with a second predetermined match score threshold; and allowing the registration of the individual with the voter selection system if the second match score exceeds the second predetermined match score threshold.

18. The method of claim 17, further including:

determining the second match score is below the second predetermined match threshold; and sending a signal to perform a manual comparison between the first digital image and the second digital image.

19. The method of claim 11, further including:

receiving a third digital image including an image of a ballot indicating at least some voting selections from the individual; and storing the third digital image in the voter selection system.

20. The method of claim 11, further including:

determining an internet protocol (IP) address from which the first digital image or the second digital image is received;

determining the physical location associated with the IP address; and sending a signal indicating a suspicious IP address if the determined physical location associated with the IP address is outside of a predetermined geographic area.

* * * * *